A. McARTHUR & W. PERCY.
REAMER.
APPLICATION FILED NOV. 13, 1913.
1,111,396.
Patented Sept. 22, 1914.
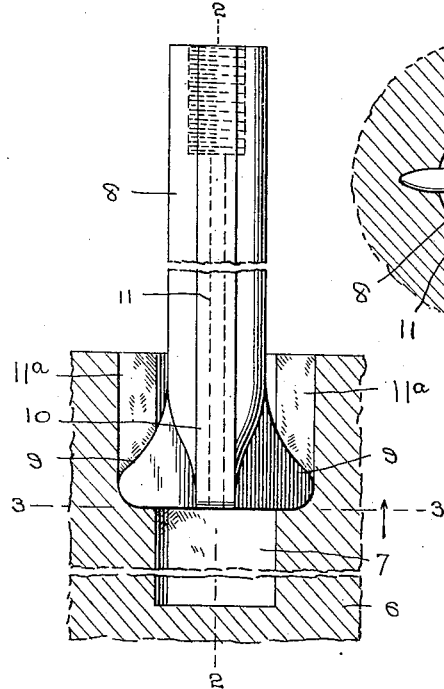
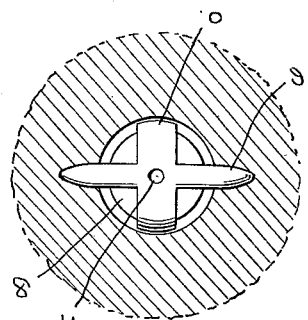
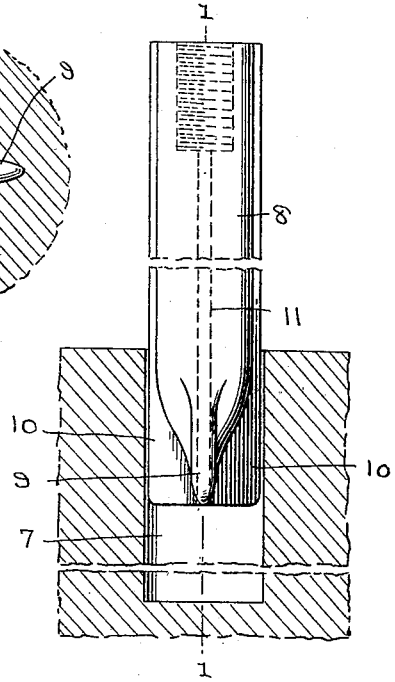
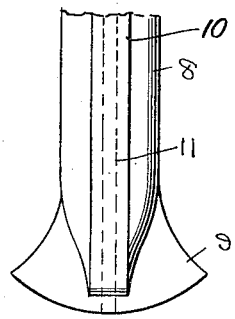
Witnesses
Thos. W. Riley
Chas. P. Beebold
Inventors
W. Percy & A. McArthur
By W. J. FitzGerald & Co.
Attorneys

UNITED STATES PATENT OFFICE.

ANDREW McARTHUR AND WILLIAM PERCY, OF LONE TREE, WASHINGTON.

REAMER.

1,111,396.    Specification of Letters Patent.    Patented Sept. 22, 1914.

Application filed November 13, 1913. Serial No. 800,856.

*To all whom it may concern:*

Be it known that we, ANDREW MCARTHUR and WILLIAM PERCY, citizens of the United States, residing at Lone Tree, in the county of Chehalis and State of Washington, have invented certain new and useful Improvements in Reamers; and we do hereby declare the following to be a full, clear, and exact description of the invention, such as will enable others skilled in the art to which it appertains to make and use the same.

Our invention relates to reamers and our object is to supply a reamer that will be of small cost, simple in construction, efficient in operation, and one easily handled and controlled when in action.

In the drawings herewith which are made a part of this application, Figure 1 shows a sectional view of a ledge of stone, a drill hole previously made therein and a reamer in position in said hole after having reamed the hole a short distance. Fig. 2 represents a sectional view on the line 2—2 of Fig. 1. Fig. 3 is a sectional view on lines 3—3 of Fig. 1. Fig. 4 represents a modified form of the cutting edge of a reamer, said cutting edge being convex in form.

In the detailed description of our invention numerals will be used to indicate the various parts and the same numeral will be used to indicate the same part throughout the various views.

A shank portion 8 formed of tool steel of any desired length or diameter having cutting members 9 formed on the lower end thereof extending at right angles to the body portion on opposite sides thereof and in a plane with each other and beyond the sides thereof a distance determined by the size of the cutting which is desired to be made at the sides of the hole to be reamed.

Longitudinally extending ribs 10 are formed along the sides of the shank portion and extending to the lower end thereof intersecting the cutting members at this point at their center as in Fig. 3. Said ribs are adapted to engage against the wall of the hole on each side and half way between the cuttings made by the reamer, while the reamer is in operation, for the purpose of guiding the cutting members. An opening or passage 11 is formed in the center of the shank portion extending the whole length thereof adapted for the passage of air or water to the hole, as may be required. The upper end of the said shank portion has an aperture extending downwardly, screw threaded to adapt it for use on a machine air drill. When in use on a hand air drill the aperture and threads may be omitted.

The object to be attained by reaming a hole and forming diametrically opposed slots in connection therewith is to direct and partially control the effect of the explosion during the blasting and in a measure control the line of cleavage.

In operation the reamer is attached to the air drill mechanism and is used substantially as an ordinary drill bit, except that while the latter is used to form a hole in the rock the reamer is used to form cuttings in the rock at the sides of the hole formed by a drill.

From the foregoing description it is believed that as the construction, advantages and manner of using our invention have been fully set forth, further description is deemed unnecessary.

What we claim and desire to protect by Letters Patent is:

A reamer, having a shank portion; two guide ribs disposed longitudinally thereof at diametrically opposite points adapted to guide the shank along the walls of the hole; two outwardly projecting cutting members at diametrically opposite points at the lower end of the shank and intermediate said longitudinally arranged ribs; said cutting members being adapted to cut longitudinal grooves along the walls of the hole for directing the plane of cleavage while blasting.

In testimony whereof we have signed our name to this specification in the presence of two subscribing witnesses.

ANDREW McARTHUR.
WILLIAM PERCY.

Witnesses:
M. O. MCCLELLAN,
J. H. CHAMBERLAIN.

Copies of this patent may be obtained for five cents each, by addressing the "Commissioner of Patents, Washington, D. C."